(12) United States Patent
Yang

(10) Patent No.: US 11,018,982 B2
(45) Date of Patent: May 25, 2021

(54) DATA FLOW SCHEDULING BETWEEN PROCESSORS

(71) Applicant: SZ DJI TECHNOLOGY CO., LTD., Guangdong (CN)

(72) Inventor: Kang Yang, Guangdong (CN)

(73) Assignee: SZ DJI TECHNOLOGY CO., LTD., Guangdon (CN)

( * ) Notice: Subject to any disclaimer, the term of this patent is extended or adjusted under 35 U.S.C. 154(b) by 24 days.

(21) Appl. No.: 16/342,522

(22) PCT Filed: Nov. 14, 2016

(86) PCT No.: PCT/CN2016/105774
§ 371 (c)(1),
(2) Date: Apr. 16, 2019

(87) PCT Pub. No.: WO2018/086131
PCT Pub. Date: May 17, 2018

(65) Prior Publication Data
US 2020/0059435 A1    Feb. 20, 2020

(51) Int. Cl.
| | |
|---|---|
| G06F 15/173 | (2006.01) |
| H04L 12/851 | (2013.01) |
| G06F 16/2455 | (2019.01) |
| G06F 16/25 | (2019.01) |
| G06F 9/38 | (2018.01) |
| G06T 1/20 | (2006.01) |

(52) U.S. Cl.
CPC ........ *H04L 47/2483* (2013.01); *G06F 9/3822* (2013.01); *G06F 16/24568* (2019.01); *G06F 16/254* (2019.01); *G06T 1/20* (2013.01)

(58) Field of Classification Search
CPC ............. H04L 47/2441; H04L 41/0806; H04L 29/12009; H04L 41/0803; H04L 45/38; H04L 47/2483
USPC .................................................. 709/223, 226
See application file for complete search history.

(56) References Cited

U.S. PATENT DOCUMENTS

2009/0257624 A1* 10/2009 Ikumi .................... G06Q 30/02
382/113

FOREIGN PATENT DOCUMENTS

| CN | 102232213 A | 11/2011 |
|---|---|---|
| CN | 104346135 A | 2/2015 |

(Continued)

OTHER PUBLICATIONS

International Search Report for Application No. PCT/CN2016/105774, dated Mar. 21, 2017, 4 pages.

(Continued)

*Primary Examiner* — Wing F Chan
*Assistant Examiner* — Andrew Woo
(74) *Attorney, Agent, or Firm* — Nicholson De Vos Webster & Elliott LLP

(57) ABSTRACT

Described herein are systems, methods, storage media, and computer programs that support data flow scheduling between processors. In one embodiment, a processor for processing data is disclosed. The processor comprises a flow classifier and a first set of circuits. The flow classifier is configured to assign a flow identifier to a data flow. The first set of circuits is configured to process a plurality of data blocks of the data flow and determine whether to provide information on the processing of the plurality of data blocks to another processor based on the flow identifier.

18 Claims, 10 Drawing Sheets

Flow Mapping 320

| Source 322 | Mapping Flow ID (FID) 324 |
|---|---|
| Source 0 (Camera 0) 330 | FID0 |
| Source 1 (Camera 1) 332 | FID1 |
| ⋮ | ⋮ |
| Source K.1 (Camera K, first portion) 334 | FIDK |
| Source K.2 (Camera K, second portion) 336 | FID(K+1) |
| ⋮ | ⋮ |
| Source M (Virtual Camera, e.g., DDR coupled to processor 104) 338 | FIDM |
| ⋮ | ⋮ |

(56) References Cited

FOREIGN PATENT DOCUMENTS

| CN | 104391747 A | 3/2015 |
|---|---|---|
| CN | 105593854 A | 5/2016 |

OTHER PUBLICATIONS

International Preliminary Report on Patentability, PCT App. No. PCT/CN2016/105774, May 23, 2019, 6 pages.
Written Opinion, PCT App. No. PCT/CN2016/105774, Mar. 21, 2017, 4 pages.

* cited by examiner

Flow Mapping 320

| Source 322 | Mapping Flow ID (FID) 324 |
|---|---|
| Source 0 (Camera 0) 330 | FID0 |
| Source 1 (Camera 1) 332 | FID1 |
| ⋮ | ⋮ |
| Source K.1 (Camera K, first portion) 334 | FIDK |
| Source K.2 (Camera K, second portion) 336 | FID(K+1) |
| ⋮ | ⋮ |
| Source M (Virtual Camera, e.g., DDR coupled to processor 104) 338 | FIDM |
| ⋮ | ⋮ |

Flow Configuration 350

| Flow ID (FID) 352 | Provide Info to Processor 104? 354 |
|---|---|
| FID0 | WAIT |
| FID1 | YES |
| ⋮ | ⋮ |
| FIDL | YES |
| FID(L+1) | NO |
| ⋮ | ⋮ |

Flow Group 1 358

US 11,018,982 B2

DATA FLOW SCHEDULING BETWEEN PROCESSORS

CROSS-REFERENCE TO RELATED APPLICATIONS

This application is a National stage of International Application No. PCT/CN2016/105774, filed Nov. 14, 2016, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to data processing, including but not exclusively, to data process scheduling.

BACKGROUND

Data processing capability of processors has been improved significantly over the years. In one front, the increase of transistor speed and transistor count enhance performance of a single processor, but the improvement of performance has been less than linear in many cases. In another front, multiple processors are implemented within a processor system, and the coordination of multiple processors provides a new dimension in performance enhancement of the processor system. The multiple processors within a processor system may be the same type. In that case, the processor system is often referred to as a homogeneous system. Alternatively, when a processor system includes different types of processors, the processor system is often referred to as a heterogeneous system. Heterogeneous systems may distribute works to the different processors to explore their different characteristics to reach optimized performance and/or power efficiency for the system.

SUMMARY

Described herein are systems, methods, storage media, and computer programs that support data flow scheduling between processors. In one embodiment, a processor for processing data is disclosed. The processor comprises a flow classifier and a first set of circuits. The flow classifier is configured to assign a flow identifier to a data flow. The first set of circuits is configured to process a plurality of data blocks of the data flow and determine whether to provide information on the processing of the plurality of data blocks to another processor based on the flow identifier.

In one embodiment, another processor for processing data is disclosed. The processor comprises a flow classifier configured to assign a flow identifier to a data flow. The processor further comprises a first set of circuits configured to process a plurality of data blocks of the data flow, determine whether to provide result of the processing to another processor based on the flow identifier, provide the result to the another processor when the flow identifier indicates to provide the result to the another processor, and provide the result to a second set of circuits within the processor otherwise.

In one embodiment, a system for processing data is disclosed. The system comprises a processor and another processor in one chip. The processor includes a flow classifier and a first set of circuits. The flow classifier is configured to assign a flow identifier to a data flow. The first set of circuits is configured to process a plurality of data blocks of the data flow and determine whether to provide information on the processing of the plurality of data blocks to another processor based on the flow identifier.

In one embodiment, a method for processing data is disclosed. The method includes assigning a flow identifier to a data flow, processing a plurality of data blocks of the data flow, and determining whether to provide information on the processing of the plurality of data blocks to another processor based on the flow identifier.

Embodiments of the present invention provide ways to schedule data processing between multiple processors of a heterogeneous system so that, taking advantages of different characteristics of the multiple processors in the heterogeneous system data are processed efficiently.

DETAILED DESCRIPTION

Figure 1:
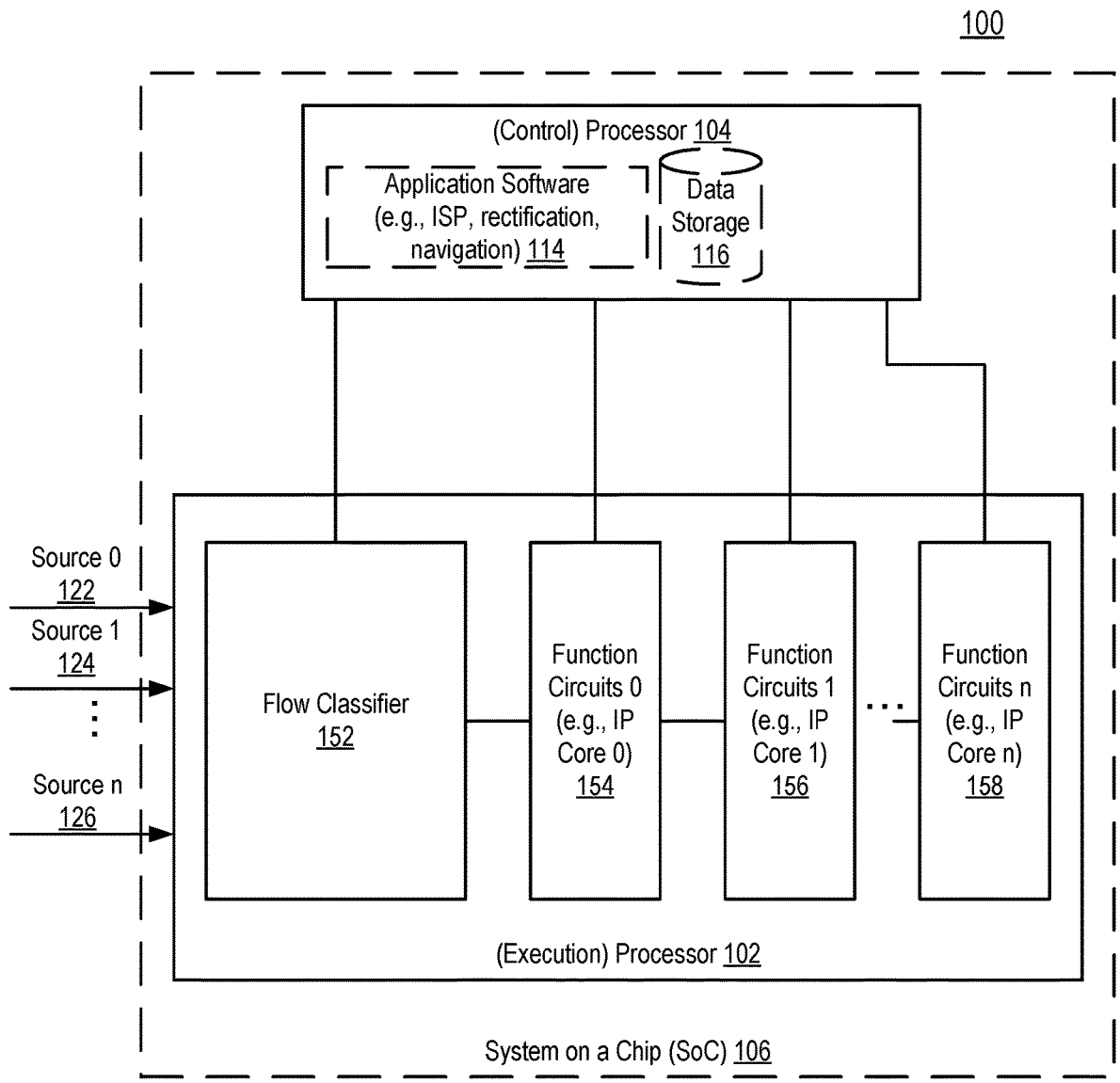
FIG. 1 is an exemplary illustration of a heterogeneous system according to one embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

In figures, Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention. Also in figures, reference numbers are used to refer to various element or components, the same reference numbers in different figures indicate the elements or components having the same or similar functionalities.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as computer or machine-readable storage media (e.g., magnetic disks, optical disks, read only memory (ROM), flash memory devices, phase change memory) and computer or machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more microprocessors coupled to one or more machine-readable storage media to store code for execution on the set of microprocessors and/or to store data. For instance, an electronic device may include non-volatile memory containing the code because the non-volatile memory can persist code/data even when the electronic device is turned off (when power is removed). When the electronic device is turned on that part of the code that is to be executed by the microprocessor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A movable object is an electronic device that includes one or more propulsion units to propel the movement of the movable object. A movable object can be an unmanned aircraft, an unmanned vehicle, or a robot. Also, the movement of the movable object can be controlled through a different electronic device off-board from the movable object (e.g., a remote terminal of the movable object that is separated from the movable object). An unmanned aircraft is also referred to as an unmanned aerial vehicle (UAV), a drone, or an unmanned aircraft system (UAS), all of which are used interchangeably referring to the unmanned aircraft herein.

A computer vision system may gain high-level understanding from digital images or videos. Through processing digital images or videos, a computer vision system may determine positioning information, reconstruct scenes, search and identify matching images or videos. These and other tasks, which can be performed by a computer vision system, are often computation intensive. As a result, a computer vision system tends to consume significant electric power, require large footprint to place, and/or only be able to complete task in non-real time. Traditionally, a computer vision system is often stationary and implemented in a computer/data center.

It is challenging to implement a computer vision system in a mobile environment, since the computer vision system needs to be compact (to save power and onboard footprint) and, at the same time, be able to perform complex computation tasks in real time. Yet implementing a computer vision system in a mobile environment has a broad appeal. For example, an onboard computer vision system in a movable object may process images/videos captured by movable object's camera(s) to make real-time decisions to guide the movable object. The movable object may determine how to navigate, given obstacles identified by the computer vision system. The movable object may also determine whether to adjust an onboard camera (e.g., zoom-in or zoom-out) based on the computer vision system's determination of whether the obtained images/videos are for the target. Additionally, the movable object may also determine whether to drop a parcel based on the computer vision system's determination of whether the position/surrounding of a location of the movable object is the expected parcel destination. Thus, the flexibility of the heterogeneous systems makes them suitable for applications like computer vision, and it is advantageous to be able to coordinate various processors within a system to achieve better performance and/or power efficiency.

In order to implement a computer vision system in a mobile environment, the computer vision system needs to be power efficient (thus consumes less battery power) and still be able to perform complex computation in real-time. In order to achieve these goals, a computer vision system may be implemented using a heterogeneous system that includes two or more processors.

Embodiments of the present invention provide ways to schedule data processing among multiple processors. It is to be noted that while computer vision is used as an example to explain the scheduling of data processing among the multiple processors, embodiments of the present invention are not limited and may be applied to applications other than computer vision.

FIG. 1 is an exemplary illustration of a heterogeneous system according to one embodiment of the invention. As shown in FIG. 1, the heterogeneous system 100 includes a processor 102 and a processor 104. The processor 102 and processor 104 may be portions (or units) of one processor or may be packaged in one die thus become a system on a chip (SoC) 106. In an alternative embodiment, the processor 102 and processor 104 are implemented in different chips.

Data from sources 0-n at references 122-126 are processed by the processor 102 and processor 104. Each source provides one or more data flows. For example, a source may be a camera, and the data flow includes images/video data captured by the camera (the data flow may be referred to as a visual data flow). In one embodiment, one camera generates one data flow. In an alternative embodiment, when a large amount of data is generated by one camera, the camera may generate multiple flows. For example, when the camera provides video data for 8K (typically one of 7680×4320, 8192×5120, and 10240×4320 pixels) ultra-high-definition (UHD) resolution at 30 frame per second (fps), the source may generate two data flows (e.g., one data flow being the left portion of the video frames and the other being the right portion) for processing efficiency.

Additionally, a source may be a data storage such as an illustrated data storage 116. The data storage may be one or more of a variety of dynamic random-access memory (DRAM) such as double data rate synchronous DRAM (DDR SDRAM or referred to simply as DDR), single data rate (SDR) SDRAM, static RAM (SRAM), persistent mass storage device (e.g., Flash, magnetic disk), and persistent memory such as Phase Change Memory (PCM), Phase Change Memory and Switch (PCMS), Memristor, and spin-transfer torque (STT) RAM. While the data storage 116 is illustrated within the processor 104, it may be outside of the processor 104 but coupled to the processor 104. Additionally, the data storage 116 may be within the processor 102, or outside of the processor 102 but coupled to the processor 102.

The processors 102 and 104 are processors with different characteristics. The processor 104 may be a general-purpose processor such as a central processing unit (CPU), a graphics processing unit (GPU), a digital signal processor (DSP), and a microcontroller (MCU). The general-purpose processor 104 may be a single-core processor or a multi-core processor, where each core includes an independent processing unit (referred to as a core) that reads and executes program instructions. A multi-core processor may have processor cores with different processing characteristics. For example, the multi-core processor may have one or more high-performance cores (often referred to as "big" cores) and one or more power-efficient cores (often referred to as "small" cores).

The processor 102 may be a special-purpose processor that is tailored to process data from sources 0-n at references 122-126. The processor 102 may be referred as an accelerator as it is built to accelerate one or more functions to process data from the sources 0-n. For example, the processor 102 may be referred to as a vision accelerator when the processor 102 is tailored to perform computer vision computation. More generically though, the processor 102 may be referred to as a hardware accelerator, which is implemented to perform specific functions.

The processor 102 includes a flow classifier 152 and function circuits 0-n at references 154-158. The flow classifier 152, including one or more circuits, maps data flows from the sources 0-n at references 122-126 to flow identifiers as discussed in more details herein below. A set of function circuits contain one or more sets of logic, cell, or chip including integrated circuits (referred to simply as circuits hereinafter) in the processor 102. A set of function circuits may implement an intellectual property (IP) core. An IP core includes intellectual property of one party, and that party may or may not be the same party that provides the processor 102. While a plurality of sets of function circuits are illustrated in the processor 102, the processor 102 may include a single set of function circuits in one embodiment. A set of function circuits may also be referred to as a circuit block in one embodiment.

A set of function circuits (or simply a set of circuits, the two terms are used interchangeably) may include a set of circuits designed to perform one or more specific functions on data it receives. For example, the processor 102 may be a vision accelerator, which may include a set of circuits to detect image edges in incoming video frames (e.g., through detecting rate of change in pixel values of a video frame), another set of circuits to detect skin-like image regions in incoming video frames, another set of circuits to determine the depth of an object (often called depth perception), and/or yet another set of circuits to detect motion (changes between successive frames) in incoming video frames. A set of circuits may include an application-specific integrated circuit (ASIC) and/or a field programmable gate array (FPGA).

A plurality of sets of circuits may be cascaded together as a series of function circuits as the illustrated function circuits 0-n at references 154-158. Data from sources 0-n at reference 122-126 may be processed by the series of function circuits. One data flow may follow one order of sets of function circuits while another data flow may follow a different order of sets of function circuits. For example, flow 1 may be processed through the flow classifier 152—function circuits 0—function circuits 1—function circuits 2, while flow 2 may be processed through the flow classifier 152—function circuits 1—function circuits 2 (thus skipping function circuits 0). Additionally, flow 3 may be processed through the flow classifier 152—function circuits 2—function circuits 0 (thus skipping function circuits 1 and having the processing order between function circuits 0 and 2 reversed).

The processor 104 coordinates processor 102's processing of data flows from the sources. The processor 104 may be tasked with data fusion to integrate data from the function circuits of the processor 102 to make a determination. For example, the data fusion may include reconstructing three dimensional (3D) images/videos based on function circuits processed data sourced from cameras at different angles, to determine whether the 3D images/videos are from a delivery destination. The processor 104 may also be tasked with flow scheduling to dictate how a data flow is to be processed among the multiple sets of function circuits. Typically, the coordination and data fusion in the processor 104 require less real-time computation than the data processing in the processor 102. For processing data flows from the sources, since the processor 104 mainly controls the data flow processing while the processor 102 performs the data flow processing itself, we may refer to the processor 104 as a control processor and refer to the processor 102 as an execution processor.

Using heterogeneous processors to process data flows may offer advantages over a single processor. A general-purpose processor often consumes more power and more computing resources in processing data flows of specific sources than a special-purpose processor, but the general-purpose processor has more flexibility in performing various tasks. For example, the processor 104 may include application software 114, which may be offered by the provider of the processor 104 or a third-party vendor. The application software 114 may be implemented to be used at application level and perform flow scheduling and/or data fusion as discussed herein above. For example, the application software 114 may be an image signal processing (ISP) module (for filtering out image noises, automatic image exposure controlling, etc.), an image rectifier that project two or more images onto a common image plane), and/or an intelligent navigator that avoids obstacles and determine an efficient route to a destination.

A special-purpose processor such as the processor 102 may be implemented aiming at accelerating data flow processing. The special-purpose processor may implement a particular set of circuits for a particular function. For example, for processing a video data flow, a set of circuits may be implemented in the special-purpose processor to detect edges of video frames as discussed herein above. Implementing such set of circuits in a general-purpose processor may not be feasible. On the other hand, a general-purpose processor is cost efficient to run common high-level tasks such as task scheduling and data fusion. That is because a large number of applications require processors to run such high-level tasks, a general-purpose processor may be optimized to run the common high-level tasks efficiently. In a heterogeneous system, a general-purpose processor may be tasked for common high-level tasks (e.g., using an application software) while the special-purpose processor may perform tasks specifically for the data flows. With the task division between the general-purpose processor and the special-purpose processor, the heterogeneous system may achieve high performance at a reasonable price.

There are several approaches to coordinate task division between the processor 102 and processor 104. A first approach is to have a high level of interaction between the two processors. For processing one data flow, a set of function circuits in the processor 102 may always ask for and obtain one or more instructions from the processor 104 to process the data flow. Once the set of circuits finishes processing, it notifies the processor 104. The processed data flow may be provided to the next set of circuits in the series of sets of circuits through which the data flow is supposed to be processed, and the next set of circuits then again asks for and obtains one or more instructions from the processor 104 to process the data flow. The process continues until the data flow finishes the processing in the processor 102. In this approach, to complete the processing of one data flow, each set of circuits may need to interact with the processor 104 twice: the first time to get the instructions and the second time to notify the processing result. The advantage of such approach is the flexibility in data flow processing: the processor 104 has full control of data flow processing in the processor 102 as the data flow goes through each of the series of sets of circuits. The downside though is that the processor 104 may become the bottleneck of the data flow processing.

The processor 104 may be a general-purpose processor that is more power efficiency and flexible—ideal for a mobile environment. Yet such general-purpose processor typically does not provide as high performance at processing data flow as that of the processor 102. The frequent interaction between the processor 102 and processor 104 in this approach drags down the overall performance of the data flow processing. For example, if a data flow is to be processed by 10 sets of circuits, and each set of circuits processes 500 frames per second, the processor 104 may need to process 10,000 frames per second (one set of circuits interacts with the processor 104 twice per frame: the first time to get the instructions to process the frame and the second time to provide the process result). Such workload likely overwhelms the processor 104 thus slows down the whole data flow processing of the heterogeneous system.

A second approach is to have a low level of interaction between the two processors. The sets of circuits within the processor 102 together are considered as a single module, and the single module only interacts with the processor 104 at the entrance and exit of the single module. Thus, for processing a data flow, the single module requests information from the processor 104 to process the data flow at the entrance of the single module, and then provides its process result to the processor 104 at the exit. Such low level of interaction requires minimum intervention from the processor 104 thus it is unlikely that the processor 104 will be the bottleneck of the data flow processing. However, the low level of interaction comes with the price of low processing flexibility. Since the processor 104 only controls the data flow processing at the entrance of the single module, the sets of circuits in the processor 102 processes a data flow without the aid of the processor 104 in the middle of a plurality of sets of circuits. Yet processing a data flow through a series of sets of circuits often needs to provide processing results of an earlier set of circuits to the processor 104, so the processor 104 may determine which later set of circuit to provide the result of the earlier set of circuits and what to provide the later set of circuits. For example, two or more later sets of circuits may be able to process the data flow after the earlier set of circuits, and it is desirable to have the processor 104 to determine which later set of circuits to provide the result of the earlier set of circuits based on one or more criteria (workloads of the later set of circuits, data flow latency requirement, etc.). For another example, sometimes only a portion of data in the data flow is needed for processing in the later set of circuits, the processor 104 may cause only that portion of data in the data flow to be provided to the later set of circuits. Thus without timely intervention, the overall efficiency of the heterogeneous system suffers and the low processing flexibility of this approach is undesirable in many cases.

Embodiments of present invention aim at overcoming the drawbacks of the above two approaches. Embodiments of present invention provide a proper level of interaction between heterogeneous processors so that a control processor such as the processor 104 will not be the bottleneck of a data flow processing, and an execution processor such as the processor 102 only interacts with the control processor when necessary. Embodiments of present invention propose identifying a data flow with a flow identifier (ID), and using the flow ID to determine how to interact between heterogeneous processors in a heterogeneous system.

Figure 2:
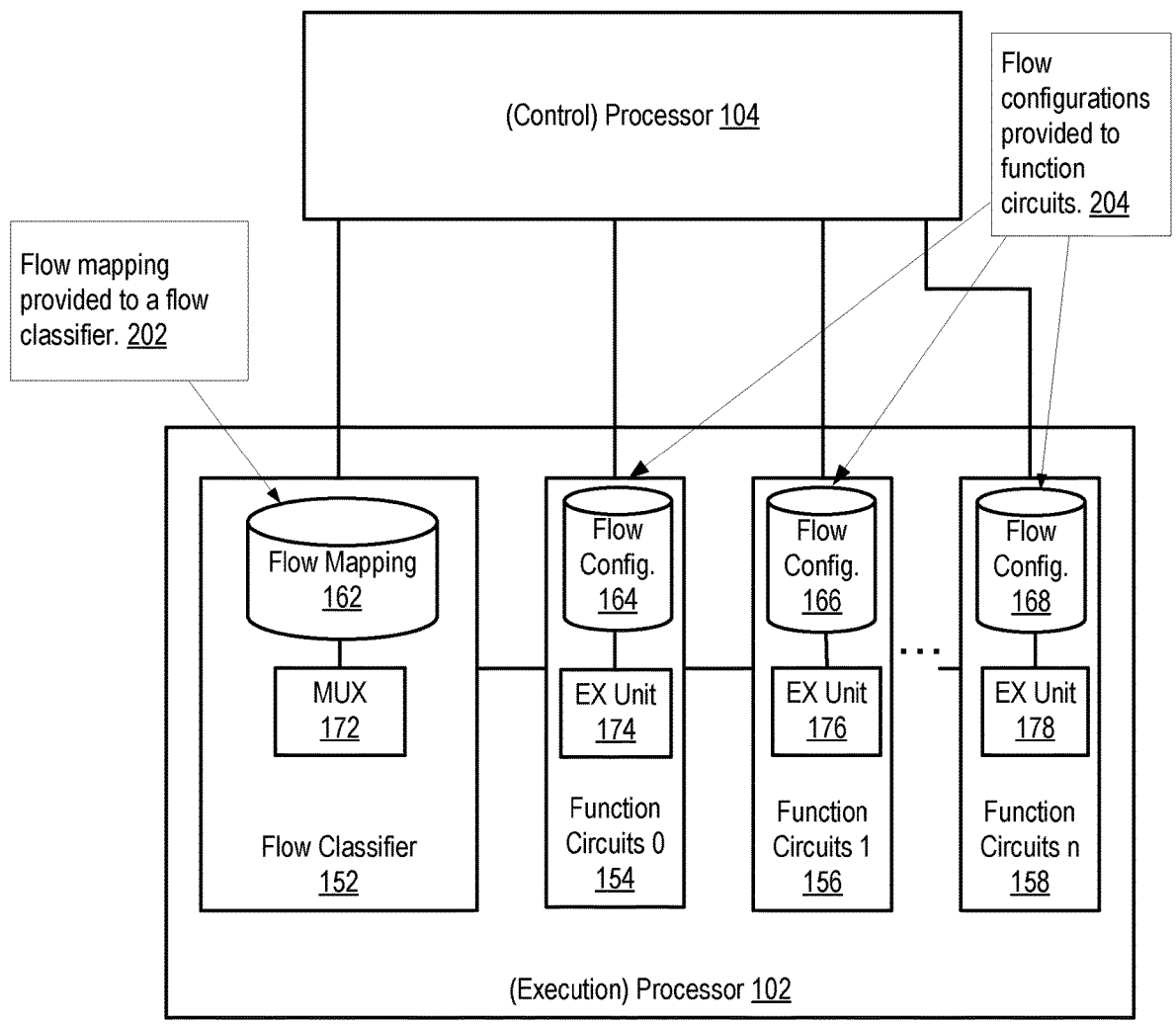
FIG. 2 illustrates flow information distribution of a heterogeneous system according to one embodiment of the invention.

FIG. 2 illustrates obtaining flow information of a heterogeneous system according to one embodiment of the invention. FIG. 2 is similar to FIG. 1 and same references indicate elements or components having the same or similar functionalities. Certain aspects of FIG. 1 have been omitted from FIG. 2 in order to avoid obscuring other aspects of FIG. 2.

In the heterogeneous system 200, the flow ID of a data flow may be used by a set of circuits to determine whether to interact with the processor 104 for processing the data flow. The processor 104 may provide flow information to the processor 102 so that the sets of circuits in the processor 102 may make the determination. The processor 104 may provide two types of flow information to the processor 102. One type is flow mapping, which defines which source maps to which flow ID. The other type is flow configuration, which defines whether flow processing information of a set of circuits is to be provided to the processor 104 and how. Additionally, the processor 102 may install flow mapping and flow configuration from elsewhere, e.g., the flow mapping and flow configuration may be obtained from the sources of the processor 102 or an interface of the processor 102. Additionally, a portion of the flow mapping and flow configuration may be obtained from the processor 104 and another portion may be obtained from the sources of the processor 102 or the interface of the processor 102.

The flow mapping information is provided to the flow classifier 152 at reference 202. The flow mapping information may be stored in a data storage of the processor 102 (containing illustrated flow mapping 162) and logically the data storage may be coupled to the flow classifier 152. The data storage may be similar to the data storage 116 discussed herein above in relation to FIG. 1.

Figures 3A, 3B:
FIG. 3A illustrates a flow mapping of a heterogeneous system according to one embodiment of the invention.
FIG. 3B illustrates flow configuration of a heterogeneous system according to one embodiment of the invention.

The flow mapping information indicates how flow identifier are mapped to flows. FIG. 3A illustrates a flow mapping of a heterogeneous system according to one embodiment of the invention. Flow mapping 320 maps various sources (e.g., sources 0-n at references 122-126 in FIG. 1) to flow IDs. In this example, source 0 at reference 330 is from a physical camera, camera 0, and it is mapped to a flow ID, FID0 (Flow ID 0). Each entry of the flow mapping 320 corresponds to a flow ID. Source 1 at reference 332 is another physical camera, camera 1, and it is mapped to a flow ID, FID1 (Flow ID 1). Also source K from a camera K is split into two data flows at references 334 and 336 and the first portion of the source K maps to FIDK (Flow ID K) and the second portion maps to another Flow ID, FID(K+1) (Flow ID (K+1)). Additionally, source M at reference 338 is from a virtual camera, e.g., not a physical camera but appears to be a camera to the processor 102. A virtual camera may be data from a data storage as discussed herein above in relation to FIG. 1. In one embodiment, the virtual camera may be data sourced from the processor 104 (e.g., a DDR DRAM coupled to the processor 104) as will be discussed in more details herein below. In this example, the source M is mapped to a flow ID FIDM (Flow ID M). Through the flow mapping 320, data flows from all sources may be mapped to various flow IDs. While in one embodiment the flow ID for each entry of the flow mapping 320 is unique, when multiple sources are determined to be processed indiscriminately by the processor 102, these multiple sources are given the same flow ID.

A flow ID may take a variety of forms. The flow ID may be a numeric number (e.g., an integer) in one embodiment. In an alternative embodiment, the flow ID may indicate the source of the data flow. For example, the flow ID FID0 may be a value extracted from the sourcing physical camera, e.g., the serial number, the organization unique identifier (OUI), or a media access control (MAC) address/Internet protocol (IP) address of the camera. For another example, the flow ID FIDM may be a value extracted from the data storage, e.g., the network interface identifier and/or port ID of the data storage from which the source M is provided to the processor 102.

With the flow mapping information being provided to the processor 102, the processor 102 can map each data flow it receives to a flow ID based on the flow mapping 320, thus guide the data flow through the data flow processing of the processor 102.

Referring back to FIG. 2, the sets of circuits of in the processor 102 are provided with flow configurations at reference 204. In one embodiment, each set of circuits includes a data storage containing the flow configuration information (illustrated as flow configurations 164-168) within each set of circuits. In an alternative embodiment, the flow configuration may be stored in a data storage of the processor 102 but each set of circuits has a specific portion of flow configuration in the data storage logically coupled to the specific set of circuits. The data storage may be similar to the data storage 116 discussed herein above in relation to FIG. 1.

The flow configuration is used by a set of circuits in the processor 102 to determine whether to provide flow processing information of a data flow to the processor 104 and how. FIG. 3B illustrates flow configuration of a heterogeneous system according to one embodiment of the invention. The flow configuration 350 may be indexed by flow IDs at reference 352. For each flow, the flow configuration 350 indicates whether to provide flow processing information of the data flow to the processor 104 and how. For example, flow configuration 350 indicates that flow FIDL is to provide the flow processing information to the processor 104 (a value indicating YES) and flow FID(L+1) is not to provide the flow processing information to the processor 104 (a value indicating NO). When the set of circuits identifies the flow ID of an incoming data flow (being FIDL or FID(L+1) in this example), the set of circuits searches the flow configuration 350 using the identified flow ID, and the set of circuits can provide (or not provide) the flow processing information in the manner indicated by the corresponding entry in the flow configuration 350 accordingly.

The data flows with flow IDs FID0 and FID1 belong to the same flow group, and it is desirable that the processor 102 provides the data flow processing information of the flow group to the processor 104 at one time instead of each individual data flow providing its own data flow processing information when that data in data flow is processed. For example, the flow configuration 350 indicates that the data flow with flow ID of FID0 may wait until one or more other data flows in the flow group is ready to provide their data flow processing information. In this example, data flows with flow IDs of FID0 and FID1 are in the same flow group 1 at reference 358, and the former (FID0) may wait (a value indicating WAIT for FID0) until the latter is ready to provide its flow processing information (a value indicating YES for FID1), so that both data flows provide their flow processing information together. The wait on condition (FID0 waiting on FID1) may be indicated explicitly or implicitly. For example, the value for FID0 may be WAIT ON FID1 (thus indicated explicitly) in one embodiment. In an alternative embodiment, the value for FID0 may be simply WAIT as by default the data flow with flow ID of FID1 being the last data flow of the flow group 1 that all other data flows wait on.

One application of flow grouping is data fusion. Data fusion may be performed at the processor 104, and since data fusion typically integrates data from various sources (e.g., a plurality of cameras), it is better to wait until data from the various sources are processed by a set of circuits in the processor 102 and then provides the processed information together to the processor 104.

Since the flow mapping 320 and flow configuration 350 are illustrated in the form of table, the former may be referred to as a flow mapping table and the latter may be referred to as a flow configuration table. However, the flow mapping and flow configuration information may be stored in a different data structure. For example, each of the flow mapping and flow configuration may also be implemented in a data structure such as records, (linked) lists, arrays, files, unions, classes, relational databases, etc.

Referring back to FIG. 2, at the flow classifier 152, a multiplexor 172 (shorthanded as MUX in the figure), implemented as one circuit in an embodiment, uses flow mapping 162 to map data flows to flow IDs. At the sets of circuits, execution units such as execution units 174-178 process the data flows using flow configurations 164-168. It is to be noted that one or more sets of circuits in the processor 102 may not use flow configuration (e.g., when it is determined that the one or more sets of circuits may complete their data flow processing of all data flows without intervention of the processor 104) while other sets of circuits in processor 102 do.

Figure 4:
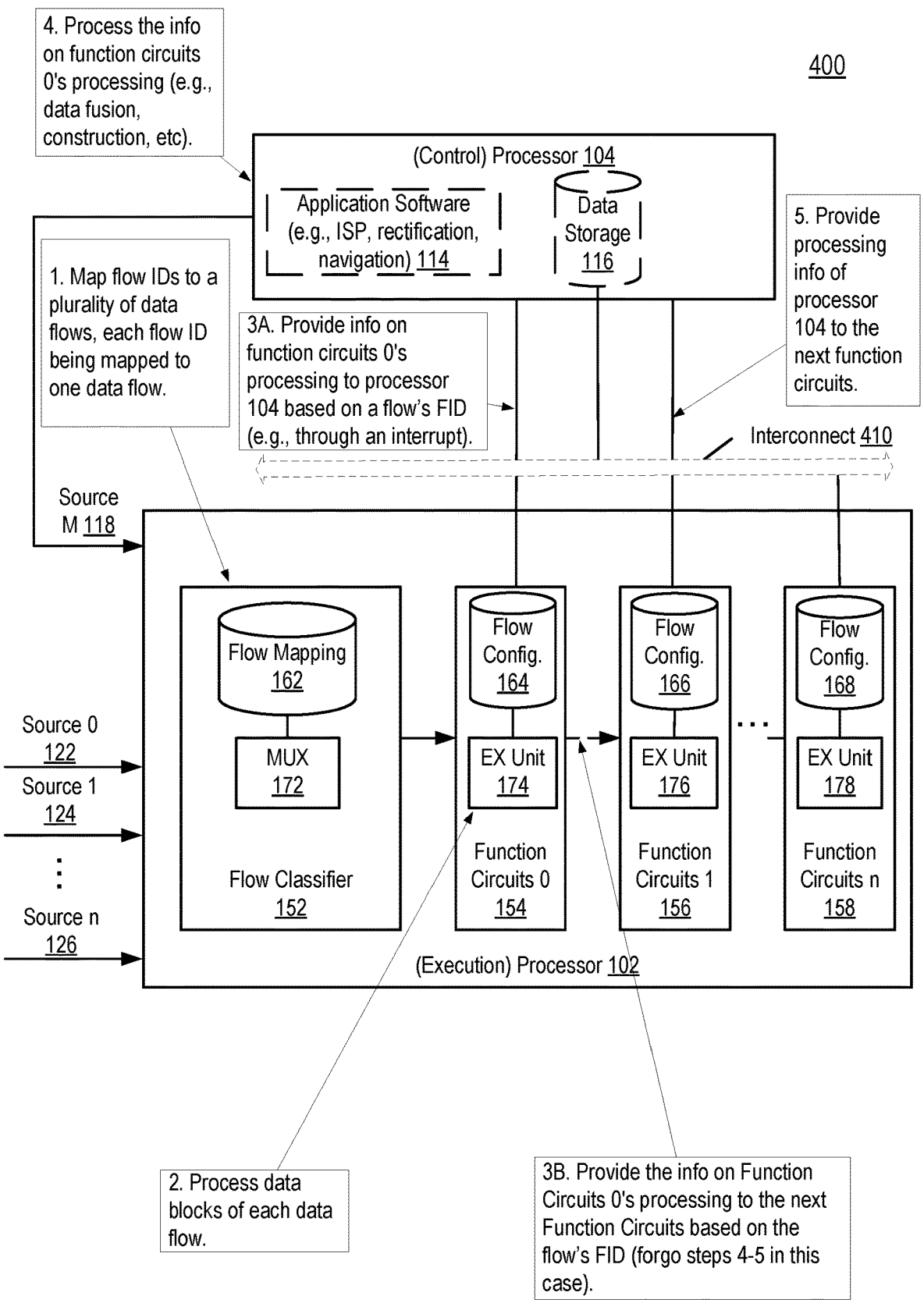
FIG. 4 illustrates data flow processing in a heterogeneous system according to one embodiment of the invention.

FIG. 4 illustrates data flow processing in a heterogeneous system according to one embodiment of the invention. FIG. 4 is similar to FIG. 1 and same references indicate elements or components having the same or similar functionalities. Certain aspects of FIG. 1 have been omitted from FIG. 4 in order to avoid obscuring other aspects of FIG. 4. Task boxes 1-5 illustrate the order in which operations are performed according to one embodiment of the invention.

At task box 1, the multiplexor 172 maps flow IDs to a plurality of data flows, each flow ID being mapped to one data flow. As discussed herein above, a source such as a camera may generate multiple data flows, and since each data flow is assigned to a flow ID, a source may be mapped to multiple flow IDs.

Figure 5A:
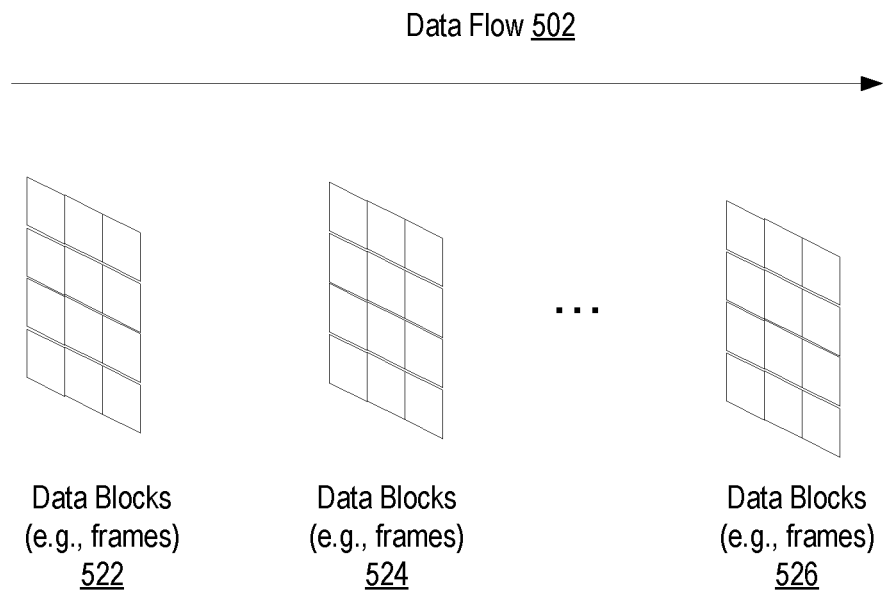
FIG. 5A illustrates data blocks in a data flow according to one embodiment of the invention.

Each data flow includes a stream of data. In one embodiment, the stream of data includes a continuous stream of video frames, e.g., a video stream of 15, 30, 60, or 120 frames per second received from a camera. FIG. 5A illustrates data blocks in a data flow according to one embodiment of the invention.

In one embodiment, a data flow 502 includes sets of data blocks such as data blocks 522-526. The plurality of data blocks in each set may be a video frame, a plurality of video frames, or a portion of a video frame. A video frame may be a key frame (also referred to as an intra-frame or I-frame) that contains data points of a complete image. A video stream may also include P-frames (predicted picture frames) that include changes from a previous frame and/or B-frames (bi-predictive picture frames) that include change from the previous frame and following frame. Each P-frame and B-frame may be represented by one or more of macroblocks and motion vectors.

A data block often includes a number of data points. Each data point may be a pixel. Each pixel may be represented by 1-48 bits. 24 bits per pixel sometimes is referred to as true color, 30/36/48 bits per pixel sometimes is referred to as deep color, and they are commonly deployed. The embodiments of the invention are not limited to a particular form of a data block.

Additionally, while the video data stream is discussed as an example of a data flow, the data flow may contain another type of data. For example, the data flow may contain an audio data flow or a flow of data sourced from one or more of a variety of sensors (e.g., a motion sensor such as an accelerometer, a gyroscope, a magnetometer, a light sensor, a compass, a proximity sensor, a thermal sensor, an altitude sensor, and an ambient light sensor). In these cases, a data block includes one or more data points generated by the source audio or the one or more of the variety of sensors. The embodiments of the invention may map flow IDs at various data blocks.

Figure 5B:
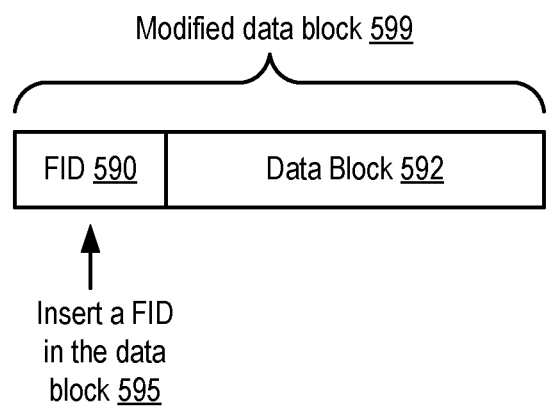
FIG. 5B illustrates assignment of a flow ID to a data block according to one embodiment of the invention.

The multiplexor 172 assigns a flow ID to a data block in one embodiment. FIG. 5B illustrates assignment of a flow ID to a data block according to one embodiment of the invention. For an illustrated data block 592, the multiplexor 172 inserts a flow ID 590 to the data block 592 at reference 595. The modified data block 599 is then provided to a set of circuits (e.g., function circuits 0 at reference 154). The flow ID 590 may be inserted to the header or the trailer of the data block 592. For example, the flow ID may be attached to a data point, a macroblock, a slice, a frame, or multiple frames.

Referring back to FIG. 4, while the multiplexor 172 may assign a flow ID to a data flow in one embodiment, the data flow from a source and arriving at the processor 102 may contain the flow ID already in an alternative embodiment. For example, a source M at reference 118 is from the processor 104, and the processor 104 may have already assigned one or more flow IDs such as FIDM to the data blocks of the one or more data flows. The one or more flow IDs may be assigned by the data storage 116, from which the source M obtains the data. In that case, the multiplexor 172 does not need to assign an additional flow ID to the one or more flows.

In addition to mapping flow IDs to data flows, the multiplexor 172 may aggregate data flows from the various sources and provide the aggregated data flows for the sets of circuits to process. The aggregation may be provided so that the time order of data flow is maintained. For example, when the sources are a plurality of cameras that generate data blocks, the data blocks remain in the same time order after being processed by the multiplexor 172 as they enter the processor 102. The plurality of cameras may have the same exposure trigger point thus the data blocks are generated simultaneously in one embodiment. After being processed by the multiplexor 172, all data blocks generated from the plurality of cameras at a time point (e.g., 10:00 am) are next to each other and follow all data blocks from the plurality of cameras generated at an earlier time point (e.g., 9:59 am). Additionally, the data blocks generated from camera 1 follow the data blocks generated from camera 0 if that is the order the data blocks entering the processor 102. Maintaining the time order of the data blocks is important in some applications. For example, when a plurality of data flows form a flow group, it is desirable that the processor 102 is to provide the data flow processing information of the whole flow group to the processor 104 at one time as discussed herein above in relation to FIG. 3B. A set of circuits needs to know, within the flow group, which data flow the other data flows shall wait so that the data flow processing information of the flow group may be provided to the processor 104 together, and it is desirable the data flow last in time is the one that the other data flows waits on so that the data flow processing information would not be provided to the processor 104 prematurely (missing the data flow processing information of one or more flows later in time).

At task box 2, the data blocks from the flow classifier 152 are provided to a set of circuits (function circuits 0 in this example), and the set of circuits processes data blocks of each data flow. The processing of a data flow generates data flow processing information of the data flow. For example, the data flow processing information may be updated data blocks. The data flow processing information may include a result of processing data blocks. For example, the set of circuits may determine the edge of a video frame and thus the result of processing data blocks may be a subset of the data blocks, the subset indicating the edges within the video frame. Alternatively or additionally, the result of processing data blocks may also include one or more values, e.g., the result of a depth perception IP core may be the determined depth of a target object.

A plurality of data blocks are processed together by the function circuits 0 at task box 2 in one embodiment. In one embodiment, the plurality of data blocks to be processed by the set of circuits may be a portion of or all of the data blocks in a video frame, or data blocks of multiple video frames.

The processing of the data blocks in a set of circuits is performed by an execution unit such as one of the execution units 174-178 in one embodiment. The execution unit executes one or more instructions on the data blocks and generates the data flow processing information. While not illustrated, a set of circuits may also include one or more other modules for executing the one or more instructions on the data blocks. The one or more other modules include one or more of a fetch unit, a decode unit, an allocation unit, a scheduling unit, a memory write unit, an exception handling unit, and an instruction retire unit (also referred to as commit unit). These modules are known in the art and their functionalities are not repeated herein.

At task box 3A, the function circuits 0 provide information on the processing of the data blocks of a data flow (e.g., data flow processing information) to the processor 104 based on the data flow's flow ID. For example, the data flow may have a flow ID of FIDL, and according to the flow configuration 350, the information on the processing of the data blocks of FIDL is supposed to be provided to the processor 104. Thus the function circuits 0 provide the information to the processor 104. The information may be provided through the processor 102 sending an interrupt request to the processor 104 so that the processor 104 is interrupted to process the information from the function circuits 0. The information from the function circuits 0 may be updated data blocks or processing results of the function circuits 0 as discussed herein above. The updated data blocks or the processing results may be provided to the processor 104 through the function circuits 0 forwarding the updated data blocks or the processing results to the processor 104, or through the function circuits providing an address/pointer for the updated data blocks or the processing results for the processor 104 to retrieve. The information is provided to the processor 104 without being provided to the next set of circuits in one embodiment, but the information is provided to the next set of circuits in addition to being provided to the processor 104 in an alternative embodiment.

Alternatively, instead of task box 3A, at task box 3B, based on the data flow's flow ID, the function circuits 0 may provide information on the processing of the data blocks of the data flow to the next sets of circuits without providing the information to the processor 104. For example, the data flow may have a flow ID of FID(L+1), and according to the flow configuration 350, the information on the processing of the data blocks of FID(L+1) is not to be provided to the processor 104. Thus the information on the processing of the data blocks of FID(L+1) is provided to the next set of circuits (function circuits 1 at reference 156 in this example) without being provided to the processor 104. Once the information is provided to the next set of circuits, the processing of data blocks of the data flow FID(L+1) is complete at the set of circuits (function circuits 0) and no more tasks are to performed (thus forgo task boxes 4-5) in this branch.

In one embodiment, the data blocks processed by the function circuits 0 may also be provided to the function circuits 1 and/or other function circuits in one embodiment. The data blocks may be provided through a bus or an interconnect 410. The bus or interconnection 410 is between the processor 102 and the processor 104 in one embodiment. The bus or interconnection 410 may be accessed by both the processor 102 and the processor 104 in one embodiment. For providing the information on the circuits' processing to the processor 104, a set of circuits may provide only one or more addresses/pointers for the updated data blocks or the processing results to the bus or interconnect 410 for the processor 104 to retrieve in one embodiment. In one embodiment, the bus or interconnection 410 is coupled to the sets of function circuits (e.g., the sources 0-n at references 122-126 provide data blocks of data flows to the bus or interconnection 410) so that the sets of circuits obtain the data blocks from the bus or interconnect 410. For example, the data storage 116 may provide data blocks of data flows for the sets of circuits to process.

At task box 4, the processor 104 processes the provided information on the processing of the data blocks of the data flow FIDL. The processing may be performed by an execution unit (not shown) of the processor 104, where the execution unit executes one or more instructions on the provided information similar to the execution unit within the processor 102. Additionally, the processor 104 may also include one or more modules such as a fetch unit, a decode unit, an allocation unit, a scheduling unit, a memory write unit, an exception handling unit, and an instruction retire unit (also referred to as commit unit). The processing may be performed by the application software 114 as discussed herein above. The processing of information provided by the function circuits 0 at the processor 104 may be updated data blocks of the data flow FIDL and/or one or more values.

At task box 5, the processor 104 provides the information on the processor 104's processing of what is provided by the function circuits 0 to the next set of circuits (function circuits 1 at reference 156 in this example). In other words, the function circuits 1 receive data from the processor 104, where the data is generated by the processor 104 in response to processing the information provided by the function circuits 0. The information provided from the processor 104 to the function circuits 1 may be the updated data blocks of the data flow FIDL and/or one or more values. In one embodiment, the processor 104 provides one or more points/addresses of the information to the function circuits 1 (e.g., providing the one or more points/addresses to the bus or interconnect 410, from which the function circuits 1 retrieve).

In one embodiment, when a data storage such as the data storage 116 is the source of a data flow, the processor 104 may provide the information on its processing such as updated data blocks back to the data storage. Since the data storage may provide its data blocks to a bus or interconnection such as the bus or interconnection 410, the updated data blocks are provided to the next set of circuits (the function circuits 1 in this example).

At the function circuits 1, the process continues. For the data flow FID(L+1), the function circuits 1 determine whether to provide information on the processing of the data blocks of FID(L+1) to the processor 104 based on the flow ID FID(L+1). The function circuits 1 may have a flow configuration different from the flow configuration of the function circuits 0, and the function circuits 1 will provide information on the processing of the data blocks of FID(L+1) to the processor 104 if the function circuits 1's flow configuration indicates so.

Similarly, for the data flow FIDL whose information on the processing in function circuits 0 is provided to the processor 104, the updated data blocks from the processor 104 and/or function circuits 0 are provided to the function circuits 1, which again determine whether to provide information on the processing of the updated data blocks of FIDL to the processor 104 based on the flow ID FIDL. The function circuits 1 provide information on the processing of the data blocks of FIDL to the processor 104 if function circuits 1's flow configuration indicates so, and otherwise the information is not provided to the processor 104. It is to be noted for both the data flows FIDL and FID(L+1), the data blocks processed by the function circuits 0 may also be provided to the function circuits 1 in one embodiment, so that the function circuits 1 process the data blocks along with the updated data blocks.

The operations in task boxes 3-5 continue to the next set of circuits until the data blocks of the data flows are processed by the series of sets of circuits for the data flows. Once the series of sets of circuits complete the processing of the data blocks, the data blocks may be provided to another processor (e.g., the processor 104 or a different processor) in one embodiment. As noted earlier, each data flow may have its own series of sets of circuits and the operations of processing complete for a data flow when its series of sets of circuits finish processing data blocks of the data flow.

Through the operations illustrated in FIG. 4, the execution of data blocks of data flows is performed by the processor 102, and the processor 104 only involves if the processor 104 indicates (through providing the flow mapping and flow configuration to the processor 102) that the processor 104 is to be provided with the information on the processing. Thus through setting the flow mapping and/or flow configuration, the processor 104 may determine whether or not to involve in the processing of a data flow at one or more set of circuits and how.

Figure 6:
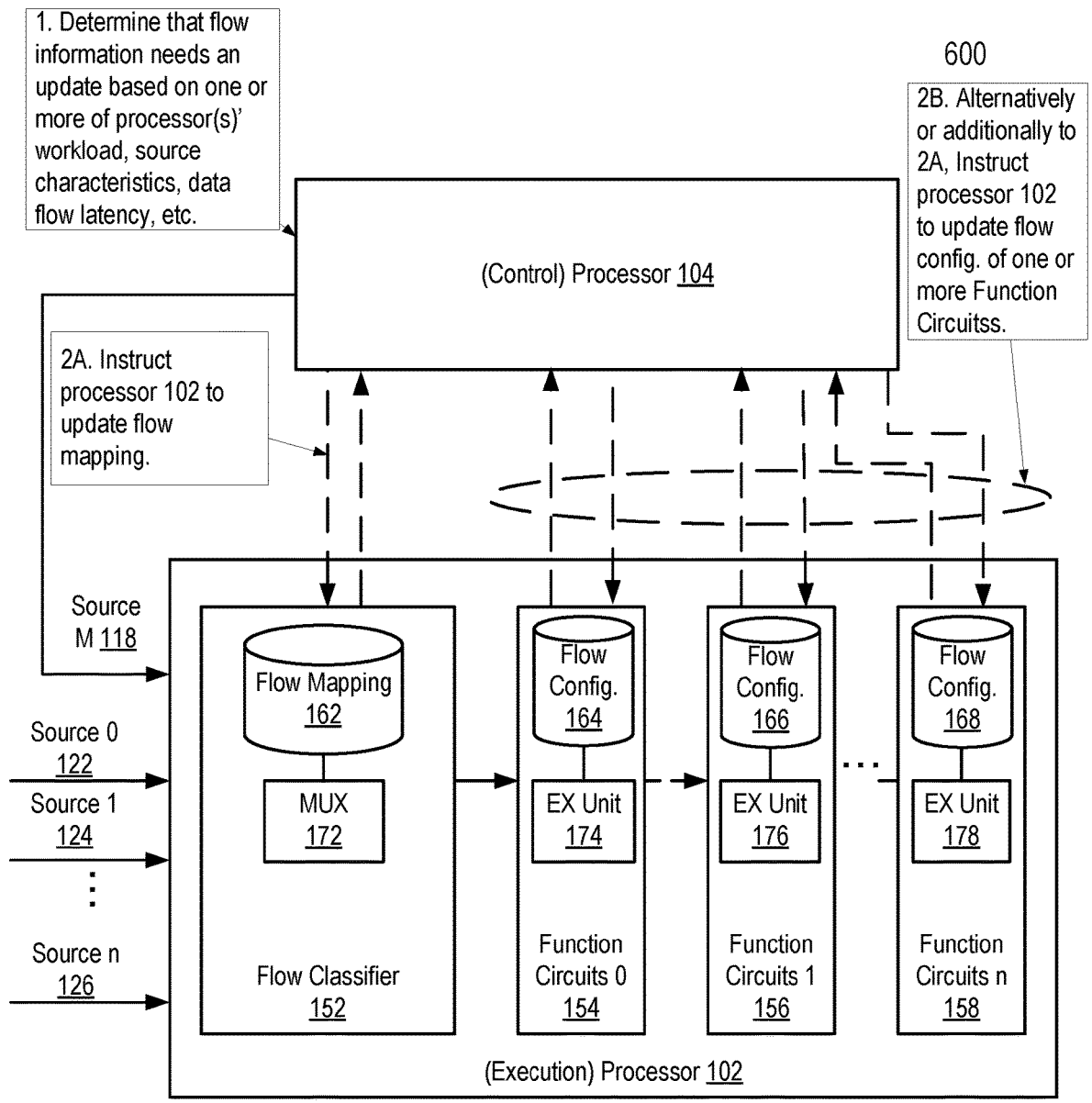
FIG. 6 illustrates updating of data flow processing in a heterogeneous system according to one embodiment of the invention.

Additionally, the processor 104 may update the flow mapping and flow configuration thus adjust the data flow processing at the processor 102. FIG. 6 illustrates updating of data flow processing in a heterogeneous system according to one embodiment of the invention. FIG. 6 is similar to FIG. 1 and same references indicate elements or components having the same or similar functionalities. Certain aspects of FIG. 1 have been omitted from FIG. 6 in order to avoid obscuring other aspects of FIG. 6. Task boxes 1-2 illustrate the order in which operations are performed according to one embodiment of the invention.

At task box 1, the processor 104 determines that flow information needs an update based on one or more of the processor(s)' workload, source characteristics, data flow latency, and etc. The flow information includes flow mapping and flow configuration as discussed herein above. As the heterogeneous system processes various data flows entering the processor 102, the workloads at the processor 102 and 104 may fluctuate. For example, some sets of circuits may be overwhelmed with processing data flows while others are not as active, or the processor 104 gets too many or too few interrupt requests from the processor 102 based on the existing flow mapping and/or flow configuration. It is desirable to adjust the flow processing based on the workloads dynamically (in contrast with static flow processing using existing flow mapping and flow configuration once a data flow enters the heterogeneous system). Similarly, a source may change its characteristics such as its data rate (bits/frames per second) as time goes on. For example, the source may be a DDR DRAM (e.g., one coupled to the processor 104) that provides a playback video data flow (source M as illustrated in FIG. 3A), and the video requires more processing resources at action scenes than at the video credits of the playback video data flow in the processor 102. Thus it is desirable to adjust the flow processing so that the processor 104 is more involved at processing the playback video data flow (i.e., causing the sets of circuits more likely to provide information on the processing to the processor 104) at the action scenes than at the beginning and/or end of the playback video data flow where the video credits are typically provided. One or more thresholds may be set for the workloads of the processor 104 and/or the processor 102. Once a workload is over a threshold (or below another threshold), the processor 104 determines that flow information needs to be updated. Similarly, one or more thresholds may be set for computation complexity of a data flow. For example, a set of circuits may report a percentage of circuit usage by a data flow to the processor 104, and if the percentage of circuit usage is over a threshold (or below another threshold), the processor 104 determines that flow information needs to be updated. As another example, a data flow may have a latency requirement, when the processing of the data flow by the processor 102 causes the data flow's latency over a threshold (or below another threshold), the processor 104 may determine that the flow information needs an update.

At task box 2A, the processor 104 instructs the processor 102 to update flow mapping. By causing the flow classifier 152 to update the flow mapping, the processor 104 causes one or more flows to be processed differently. For example, when the playback video data flow discussed herein above changes flow mapping from FIDM to FID(M+1), the playback video data flow will be processed differently at the various sets of circuits as the flow configuration for FID(M+1) may be different from that of FIDM at the various sets of circuits.

Alternatively or additionally, the processor 104 instructs the processor 102 to update flow configuration of one or more sets of circuits at task box 2B. By causing the flow configuration in a set of circuits to update, the processor 104 changes whether or not or how the set of circuits provides information on the processing of a data flow. For example, a change may cause the set of circuits from not providing the information to the processor 104 to providing the information or vice versa. Another change may cause the set of circuits from providing the information on the processing of the flow to the processor 104 right away (after a determined set of data blocks of the flow being processed) to wait until one or more data flows finishing their processing (e.g., because the one or more data flows are in the same flow group as the data flow), or vice versa.

The update of flow mapping is often a bigger change to the data flow processing than the update of flow configuration in a set of circuits. That is because in the former, each flow ID corresponds to a setting of how to coordinate the data flow's processing with the processor 104 at various sets of circuits, each flow ID having an entry in the flow configuration for such coordination. In contrast, updating flow configuration in a set of circuits may affect data flow processing of only the data flows being process at the set of circuits.

Through operations related to the ones illustrated in FIGS. 4 and 6, the processor 104 may dynamically control the processing of a data flow by the processor 102. Thus embodiments of the invention offer advantages over the first and second approaches discussed herein above. Unlike the first approach, not all the sets of circuits are required to interact with the processor 104 for all data flows, and in embodiments of the invention a set of circuits provides information on processing of a data flow only when the set of circuits' flow configuration indicates so. Thus, the processor 104 can avoid to be the bottleneck of the data flow processing. Unlike the second approach, where the processor 104 may interact with a plurality of sets of circuits as a single module, in embodiments of the invention the processor 104 may interact with a set of circuits as necessary by updating the flow mapping of the flow identifier and/or flow configuration of the set of circuits. Thus the processor 104 have more chances to cause change of processor's 102's data flow processing instead of only the entrance and exit of a single module including all of the plurality of sets of circuits.

Figure 7:
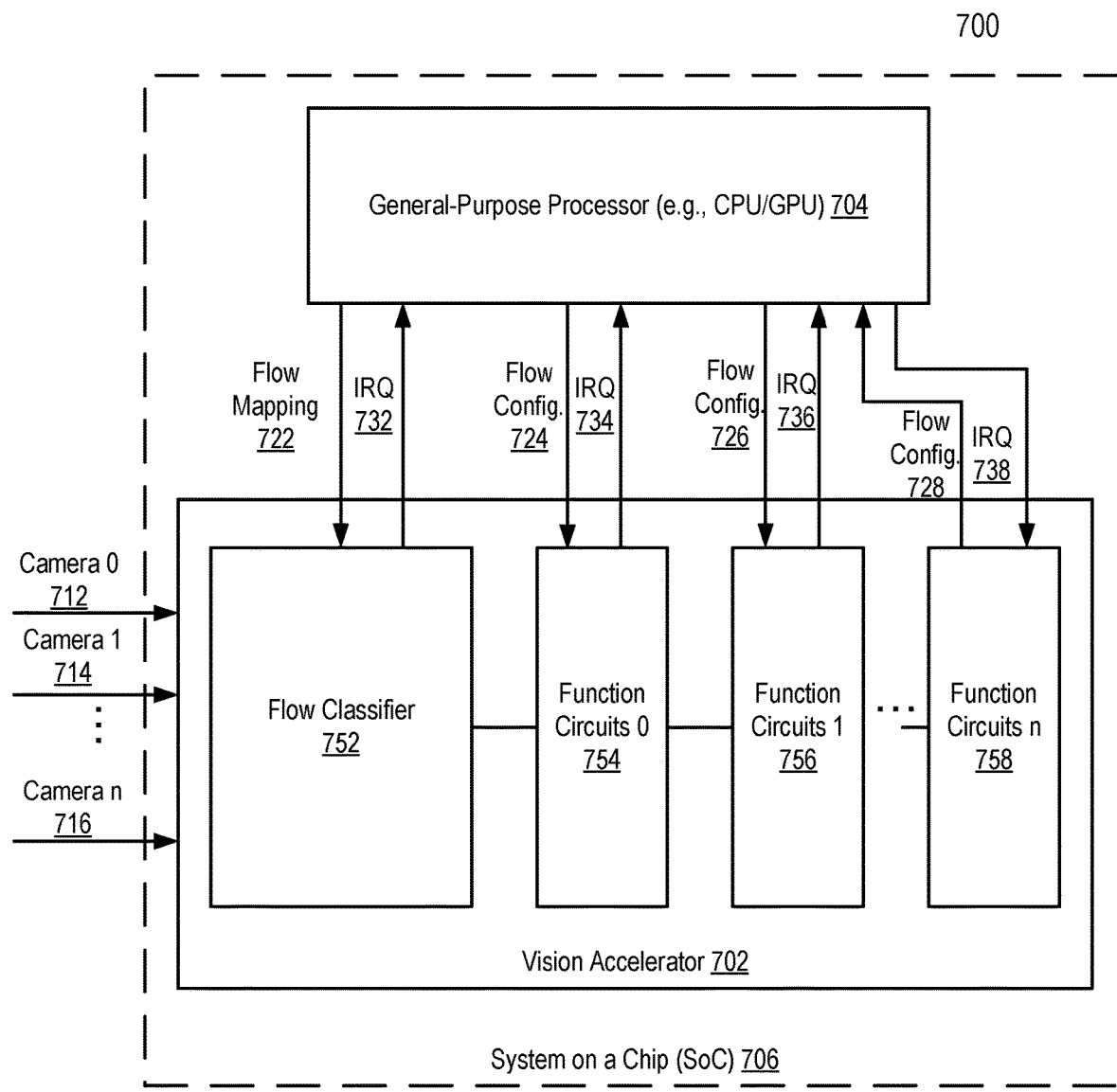
FIG. 7 illustrates video data flow processing in a heterogeneous system according to one embodiment of the invention.

FIG. 7 illustrates video data flow processing in a heterogeneous system according to one embodiment of the invention. FIG. 7 is similar to FIG. 1 and same references indicate elements or components having the same or similar functionalities. System 700 is an embodiment of the present invention where the data flow processing is specifically for computer vision application.

System 700 includes a general-purpose processor 704 and a vision accelerator 702. The general-purpose processor 704 may be a central processing unit (CPU), a graphics processing unit (GPU), a digital signal processor (DSP), or a microcontroller (MCU). The vision accelerator 702 is specifically tailored to perform computer vision computation. The vision accelerator 702 includes a flow classifier 752, which may be implemented in one or more circuit, and one or more sets of circuits such as function circuits 0-n at references 754-758, the functions of flow classifiers and the sets of circuits are discussed herein above. The vision accelerator 702 and general-purpose processor 704 may be portions (or units) of one processor or may be packaged in one die thus become a system on a chip (SoC) 706. In an alternative embodiment, the vision accelerator 702 and general-purpose processor 704 are implemented in different chips.

The general-purpose processor 704 provides a flow mapping such as flow mapping 722 to the flow classifier 752 and flow configurations such as flow configurations 724-728 to the various sets of circuits in the vision accelerator 702. Reversely, the vision accelerator 702 sends interrupt requests (shorthanded as IRQs) such as IRQs 732-738 to the general-purpose processor 704. An interrupt request may include information on the processing of a data flow (the data flow may be processed at one of the data point level, data block level, the video frame level, or multiple video frame level). The information may be the result of processing a data flow, and the result may include one or more values from processing the data flow. The interrupt requests may cause an interrupt handler at the general-purpose processor 704 to run, where the interrupt handler processes the information provided by the sets of circuits. In one embodiment, an interrupt request is a fast interrupt request (FIQ), which indicates a request for a fast, low latency interrupt, and which takes precedence over a general interrupt.

Figure 8:
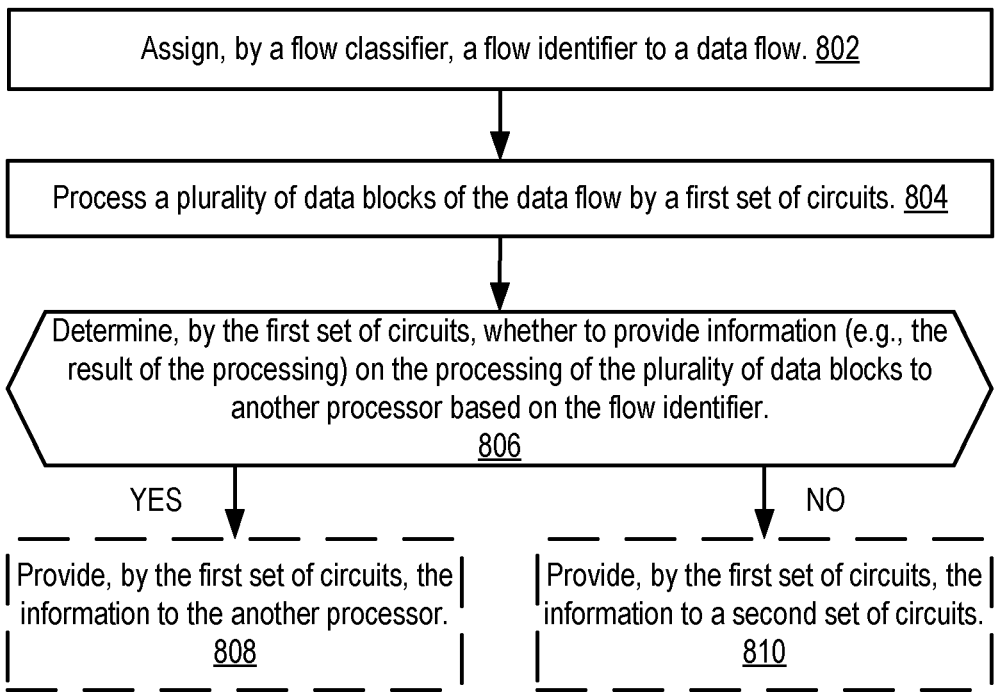
FIG. 8 is a flow diagram illustrating data flow processing in a heterogeneous system according to one embodiment of the invention.

FIG. 8 is a flow diagram illustrating data flow processing in a heterogeneous system according to one embodiment of the invention. The heterogeneous system includes at least two processors such as the processor 102 and the processor 104 as discussed herein above. The method 800 may be implemented in a processor such as the processor 102 that includes a flow classifier and one or more sets of circuits. Each set of circuits is implemented to perform a certain function on an incoming data flow, and it implements an IP core in one embodiment of the invention.

At reference 802, a flow classifier assigns a flow identifier (ID) to a data flow. The data flow may be sourced from one of the sources 0-n as discussed herein above. In one embodiment, the data flow is sourced from a camera. In that case, the data flow is a visual data flow captured by the camera and containing a stream of video frames. The data flow may belong to a flow group that includes a plurality of data flows, and the flow classifier will maintain the order within the data flow and also the order between the plurality of data flows of the flow group. For example, the flow classifier maintains the time order of the data blocks within the flow group in one embodiment.

In one embodiment, the data flow is sourced from a data storage (e.g. the data storage 116 coupled to another processor such as the processor 104 illustrated in FIG. 1). When the data flow is sourced from the another processor, the another processor may have already assigned a flow ID to the data flow thus the flow classifier no longer assigns a flow ID to the data flow. The another processor may assign a flow ID on individual data blocks to make the individual data blocks to appear to be in a data flow thus the processor 102 treats the data blocks sourced from the data storage similarly to ones sourced from a camera.

In one embodiment, the flow classifier assigns the flow ID based on flow mapping received from the another processor. The flow mapping may be the flow mapping 320 in one embodiment, and the flow mapping 320 is discussed herein above in relation to FIGS. 2 and 3A. In one embodiment, the assignment of the flow ID to the data flow includes attaching the flow ID to data blocks of the data flow.

At reference 804, a first set of circuits of the processor processes a plurality of data blocks of the data flow. The plurality of data blocks may be of a portion of a frame, a frame, or multiple frames. The first set of circuits selects the plurality of data blocks suitable for its processing, and the first set of circuits may select a first amount of data blocks to process, where the first amount of data blocks is different from a second amount of data blocks to be processed on another set of circuits (e.g., the second set of circuits). In other words, each set of circuits may select the amount of data blocks suitable for its own processing. The processing of the plurality of data blocks may perform one or more functions, e.g., a set of circuits may detect image edges, depth of an object, and/or motion as discussed herein above.

The first set of circuits may not be the very first set of circuits through which the plurality of data blocks is processed. For example, the first set of circuits may be the function circuits 1 instead of function circuits 0 in FIG. 4. In that case, the plurality of data blocks may be updated data blocks from an earlier set of circuits (e.g., function circuits 0) or the control processor such as the processor 104.

At reference 806, the first set of circuits determines whether to provide information on the processing of the plurality of data blocks to another processor based on the flow identifier. The information on the processing of the plurality of data blocks may be updated data blocks or processing results such as a subset of the data blocks or one or more values as discussed herein above.

The determination is based on flow configuration received from the another processor in one embodiment. The flow configuration is included in a configuration table, where each entry of the configuration table corresponds to a flow ID in one embodiment. In one embodiment, the flow configuration includes mapping of the flow identifier to one of at least three values, a first value indicating to provide the information to the another processor instantaneously, a second value indicating to provide the information to the another processor after a delay, and a third value indicating not to provide the information to the another processor as discussed herein above in relation to FIG. 3B. The instant providing of the information refers to right after the plurality of data blocks is processed by the first set of circuits, e.g., within milliseconds (1 ms-1,000 ms). The delay is to wait on another data flow's data blocks being processed by the first set of circuits, where the other data flow is within the same flow group as the present data flow. The delay can be a variable (e.g., as long as it takes the other data flow of the same flow group to finish its processing) or a fixed time value (e.g., waiting for 1 second and then providing information on the processing of all data blocks of the flow group to the another processor, even if one or more data flows appear not completing their processing of their respective data blocks yet).

As discussed herein above, when the data flow belongs to a flow group including a plurality of data flows, the information on processing data blocks within the flow group is determined to be provided to the another processor based on flow identifiers of the plurality of data flows. The information may be determined to be provided instantaneously when the data flow is the last data flow in time of the flow group or after a delay when another data flow is the last data flow in time of the flow group. The flow configuration discussed herein above aids the determination of whether or not and how to provide the information on processing the data blocks.

Based on the determination at reference 806, the processor provides the information on processing of the data blocks. Optionally at reference 808, when the flow identifier indicates to provide the information to the another processor, the first set of circuits provides the information to the another processor. As discussed herein above, the providing of the information may be instantaneously or after a delay. Optionally at reference 810, when the flow identifier indicates to provide the information to the second set of circuits, the first set of circuits provides the information to the second set of circuits. The indication of providing the information to the second set of circuits may be not to provide the information to the another processor (e.g., the NO value for FID(L+1) at FIG. 3B).

In one embodiment, providing the information on the processing of the plurality of data blocks is a binary operation, i.e., either providing the information to the another processor or to the second set of circuits. In an alternative embodiment, the first set of circuits may provide the information on the processing of the plurality of data blocks to the another processor as well as to the second set of circuits when the flow identifier indicates to provide the information to the another processor (e.g., the YES value for FIDL of FIG. 3B). Additionally, in one embodiment, the plurality of data blocks may be provided to the second set of circuits (e.g., through a bus interconnect discussed herein above), along with the information on the processing of the plurality of data blocks (e.g., upon the NO value of the flow configuration) or without the information (e.g. upon the YES value of the flow configuration).

The information on the processing of the plurality of data blocks provided to the another processor is processed at the another processor, and the another processor provides its information on processing to the second set of circuits as discussed herein above in relation to FIG. 4 task boxes 4-5.

In one embodiment, the flow classifier is implemented as a means for assign a flow identifier to a data flow, and the first set of circuits is implemented as a means for processing a plurality of data blocks of the data flow and determining whether to provide information on the processing of the plurality of data blocks to another processor based on the flow identifier. Additionally, the first set of circuits is implemented as a means for providing the information to the another processor when the flow identifier indicates to provide the information to the another processor, and/or for providing the information to a second set of circuits within the processor when the flow identifier indicates to provide the information to the second set of circuits, in one or more embodiments of the invention. In other words, a means to implement the flow classifier may perform the operations described herein by the flow classifier, and a means to implement the first and second sets of circuits may perform the operations described herein by the first and second sets of circuits.

Figure 9:
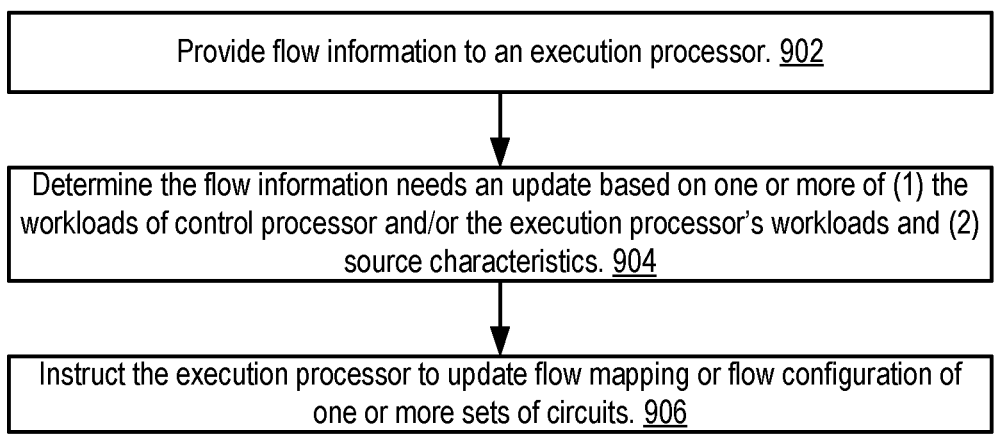
FIG. 9 is a flow diagram illustrating distribution of flow information in a heterogeneous system according to one embodiment of the invention.

FIG. 9 is a flow diagram illustrating distribution of flow information in a heterogeneous system according to one embodiment of the invention. The heterogeneous system includes at least two processors such as the processor 102 and the processor 104 as discussed herein above. The method 900 may be implemented in a control processor such as the processor 104.

At reference 902, the processor provides flow information to an execution processor. The execution processor is a processor such as the processor 102 that processes one or more data flows. The flow information includes two types of information: flow mapping that defines which source maps to which flow ID, and flow configuration that defines whether flow processing information of a set of circuits (e.g., implementing an IP core as discussed herein above) is to be provided to the processor 104 and how. As discussed herein above in relation to FIGS. 2-4, the flow information is used by the execution processor to process the one or more data flows, which are from one or more sources.

At reference 904, the processor determines that the flow information needs an update based on one or more of the workloads of the processor (control processor) and/or the execution processor and source characteristics. Then at reference 906, the processor instructs the execution processor to update flow mapping and/or flow configuration. The process of the determining and instructing is discussed herein above in relation to FIG. 6.

In one embodiment, the processor includes a means for providing flow information to an execution processor, a means for determining that the flow information needs an update based on one or more of the workloads of the processor (control processor) and/or the execution processor and source characteristics, and a means for instructing the execution processor to update flow mapping and/or flow configuration.

Figure 10:
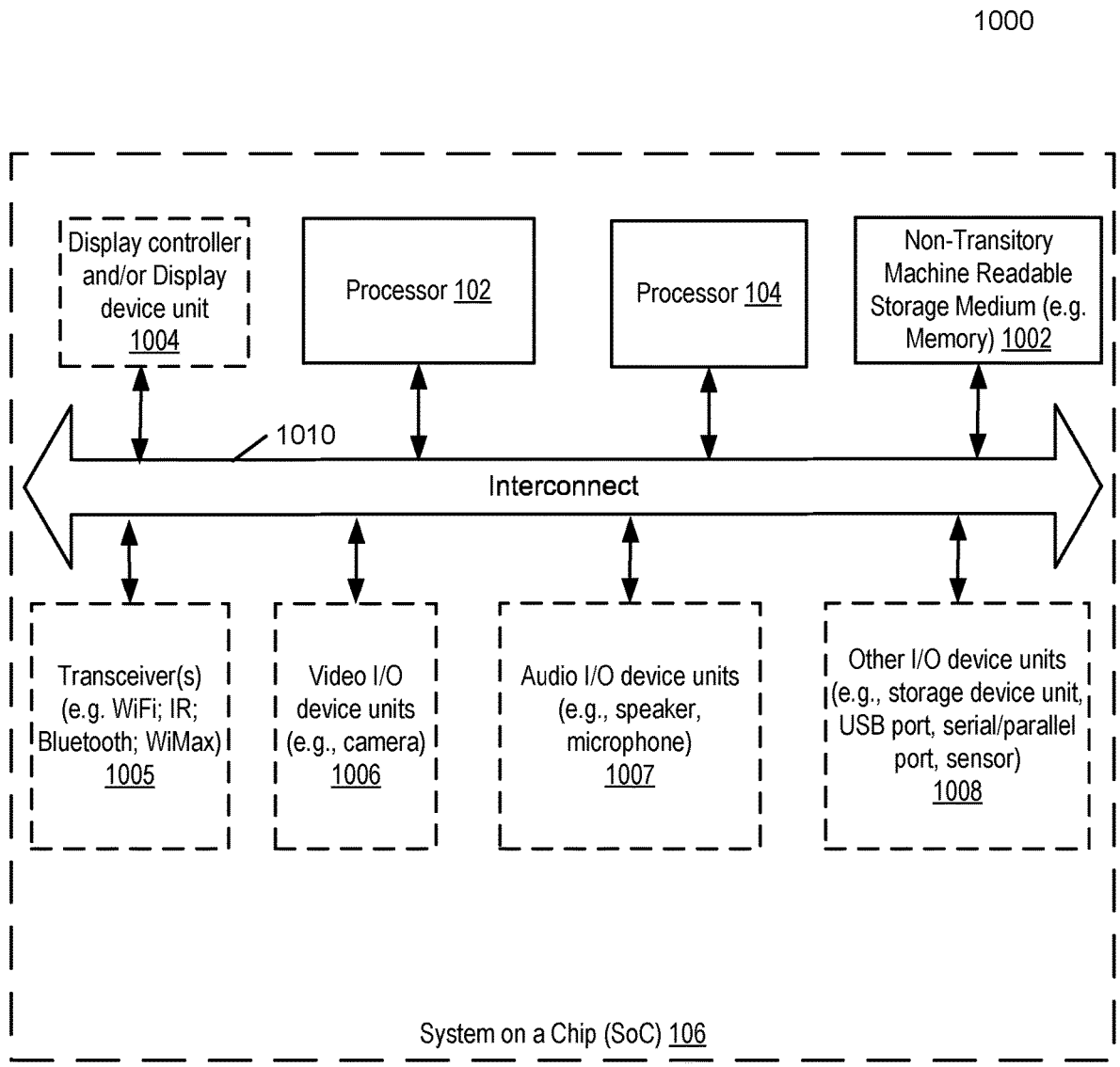
FIG. 10 is an exemplary illustration of a heterogeneous system according to one embodiment of the invention.

FIG. 10 is an exemplary illustration of a heterogeneous system according to one embodiment of the invention. The heterogeneous system 1000 includes many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the heterogeneous system 1000 is intended to show a high level view of many components of the computing system. However, it is to be understood that additional components may be present in certain implementations and furthermore, different arrangement of the components shown may occur in other implementations. In one embodiment, the heterogeneous system 1000 comprises the system on a chip (SoC) 106, which contains the processor 102 and the processor 104 as discussed herein above. In an alternative embodiment, the processor 102 and the processor 104 are implemented on different dies (chips).

In one embodiment, in addition to the processor 102 and the processor 104, the heterogeneous system 1000 includes non-transitory machine-readable storage medium 1002, and optional devices 1004-1008 that are interconnected via a bus or an interconnect 1010. The processor 104 represents one or more general-purpose processors such as a central processing unit (CPU), or processing device. More particularly, the processor 104 may be a complex instruction set computing (CISC) microprocessor, reduced instruction set computing (RISC) microprocessor, very long instruction word (VLIW) microprocessor, or microprocessor implementing other instruction sets, or microprocessors implementing a combination of instruction sets. The processor 102 may be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Each of the processor 102 and the processor 104 may communicate with non-transitory machine-readable storage medium 1002 (also called computer-readable storage medium), such as magnetic disks, optical disks, read only memory (ROM), flash memory devices, and phase change memory. The non-transitory machine-readable storage medium 1002 may store information including sequences of instructions, such as computer programs, that are executed by the processor 102, the processor 104, or any other device units. For example, executable code and/or data of a variety of operating systems, device drivers, firmware (e.g., input output basic system or basic input/output system (BIOS)), and/or applications can be loaded in the processor 102 or the processor 104 and executed by the processor 102 or the processor 104. Additionally, the non-transitory machine-readable storage medium 1002 may also include the data storage (e.g., a DDR SDRAM) discussed herein above that store data to be processed by the processor 102 and the processor 104.

The heterogeneous system 1000 may optionally further include display control and/or display device unit 1004, transceiver(s) 1005, video input/output (I/O) device unit(s) 1006, audio I/O device unit(s) 1007, and other I/O device units 1008 as illustrated. The transceiver 1005 may be a wireline transceiver or a wireless one such as a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 1006 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. The video I/O device unit 1006 may be a camera/camcorder (e.g., standard definition (SD) or high definition (HD) such as 4K, 8K or higher) in one embodiment.

An audio I/O device unit 1007 may include a speaker and/or a microphone to facilitate voice-enabled functions, such as voice recognition, voice replication, digital recording, and/or telephony functions. Other optional I/O devices 1008 may include a storage device (e.g., a hard drive, a flash memory device), universal serial bus (USB) port(s), parallel port(s), serial port(s), a printer, a network interface, a bus bridge (e.g., a PCI (peripheral component interconnect)—PCI bridge), sensor(s) (e.g., one or more of a positioning sensor, a motion sensor such as an accelerometer, an inertial sensor, an image sensor, a gyroscope, a magnetometer, a light sensor, a compass, a proximity sensor, a thermal sensor, an altitude sensor, and an ambient light sensor), or a combination thereof. The positioning sensor may be for a positioning system such as global positioning system (GPS), global navigation satellite system (GLONASS), Galileo, Beidou, or GPS aided Geo Augmented Navigation (GAGAN). The other optional I/O devices 1008 may further include certain sensors coupled to the interconnect 1010 via a sensor hub (not shown), while other devices such as a thermal sensor, an altitude sensor, an accelerometer, and an ambient light sensor may be controlled by an embedded controller (not shown), dependent upon the specific configuration or design of the heterogeneous system 1000.

Figure 11:
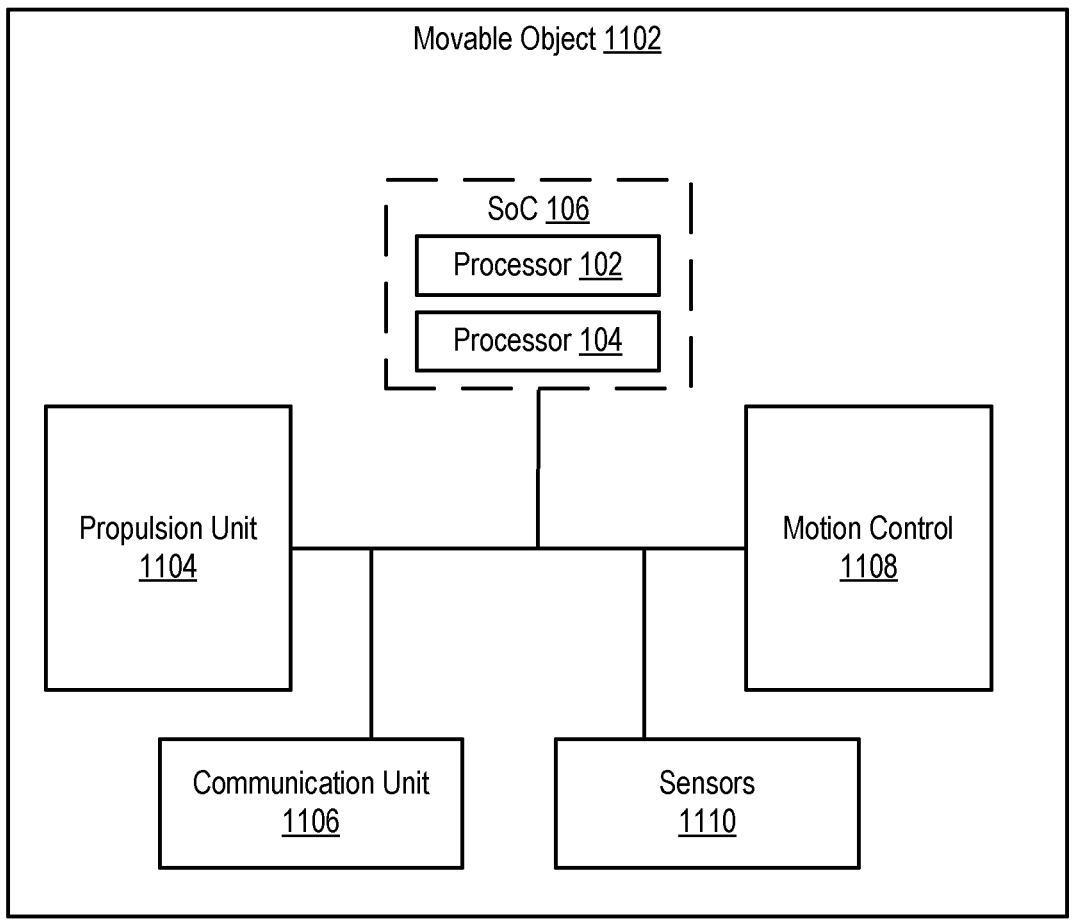
FIG. 11 is an exemplary illustration of a movable object according to one embodiment of the invention.

The heterogeneous system 1000 may be implemented in a movable object. FIG. 11 is an exemplary illustration of a movable object according to one embodiment of the invention. The movable object 1102 includes the SoC 106 discussed herein above in one embodiment. In an alternative embodiment, the movable object 1102 includes the processor 102, the processor 104, non-transitory machine-readable storage medium 1002, and optional devices 1004-1008 that are interconnected via a bus or an interconnect 1010 but these entities are not implemented in a single chip. In addition to the heterogeneous system implemented in a SoC or otherwise, the movable object 1102 also includes one or more of a propulsion unit 1104, a motion control 1108, a communication unit 1106 and one or more sensors 1110, each of which may include one or more circuits.

The propulsion unit 1104 of the movable object 1102 may include one or more devices or systems operable to generate forces for sustaining controlled movement of the movable object 1102. The propulsion unit 1104 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. The propulsion unit 1104 may also include one or more rotary components connected to the power source and configured to participate in the generation of forces for sustaining controlled motion (e.g., flight or moving along a surface). For instance, rotary components may include rotors, propellers, blades, nozzles, etc., which may be driven on or by a shaft, axle, wheel, hydraulic system, pneumatic system, or other component or system configured to transfer power from the power source. The propulsion unit 1104 and/or rotary components may be adjustable with respect to each other and/or with respect to the movable object 1102. The propulsion unit 1104 may be configured to propel the movable object 1102 in one or more vertical and horizontal directions and to allow the movable object 1102 to rotate about one or more axes. That is, the propulsion unit 1104 may be configured to provide lift and/or thrust for creating and maintaining translational and rotational movements of the movable object 1102.

The motion control 1108 of the movable object 1102 may convert a command (which is intuitive to a remote operator of the movable object) into one or more motion control signals or motion parameters that can be directly used to adjust the motion of the movable object. A motion control signal or motion parameters may control one or more aspects of motion achievable by a movable object. For example, through a motion control signal or motion parameters, the motion control 1108 may direct the movable object 1102 (e.g., through control the propulsion unit 1104) to move at a desired translational movement (at a vertical, a horizontal, or an angled direction), a desired rotational movement, desired speed, and/or desired acceleration.

The communication unit 1106 of the movable object 1102 may enable communications of data, information, commands, and/or other types of signals between the movable object 1102 (e.g., the motion control 1108 specifically) and a remote terminal of the movable object 1102. The communication unit 1106, implemented in one or more circuits in one embodiment, may communicate with the remote terminal via one or more communication networks, such as radio, cellular, Bluetooth, Wi-Fi, radio-frequency identification (RFID), and/or other types of communication networks usable to transmit signals indicative of data, information, commands, and/or other signals.

The sensors 1110 include one or more sensors implemented in the movable object 1102, and one sensor may be one of a positioning sensor, a motion sensor such as an accelerometer, an inertial sensor, an image sensor, a gyroscope, a magnetometer, a light sensor, a compass, a proximity sensor, a thermal sensor, an altitude sensor, and an ambient light sensor. The sensors 1110 generate data and information to be used to determine information about the movable object 1102, its component(s), or its target(s). The communication unit 1106 may communicate the generated data and information to other units of the movable object 1102 (e.g., the processors 102 and/or 104, the propulsion unit 1104, the motion control 1108) or the remote terminal of the movable object 1102.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A processor for processing data, comprising:
   a flow classifier configured to assign a flow identifier to a data flow, wherein the data flow comprises data captured by a same camera; and
   a first set of circuits configured to
      process a plurality of data blocks of the data flow, and
      determine whether to provide information on the processing of the plurality of data blocks to another processor based on the flow identifier, wherein the flow identifier corresponds to an entry of a data structure, and wherein the data structure is to store flow configuration received from the another processor.

2. The processor of claim 1, wherein the first set of circuits is configured to provide the information to the another processor when the flow identifier indicates to provide the information to the another processor.

3. The processor of claim 1, wherein the first set of circuits is configured to provide the information to a second set of circuits within the processor when the flow identifier indicates to provide the information to the second set of circuits.

4. The processor of claim 1, wherein the first set of circuits receives the plurality of data blocks from the another processor, a camera, or a data storage.

5. The processor of claim 1, wherein the assignment of the flow identifier is based on flow mapping received from the another processor.

6. The processor of claim 1, wherein the assignment of the flow identifier includes attaching the flow identifier to the plurality of data blocks.

7. The processor of claim 1, wherein the data structure comprises a configuration table.

8. The processor of claim 1, wherein the flow configuration includes mapping of the flow identifier to one of at least three values, a first value indicating to provide the information to the another processor instantaneously, a second value indicating to provide the information to the another processor after a delay, and a third value indicating not to provide the information to the another processor.

9. The processor of claim 1, wherein the data flow belongs to a flow group including a plurality of data flows, wherein the information provided to the another processor based on one or more flow identifiers of the plurality of data flows.

10. The processor of claim 9, wherein the flow classifier maintains order of the data blocks within the flow group.

11. The processor of claim 1, wherein the data flow is sourced from the another processor.

12. The processor of claim 1, wherein the data flow comprises a visual data flow captured by the same camera.

13. The processor of claim 12, wherein the visual data flow is one of a plurality of visual data flows captured concurrently by a plurality of cameras, and the flow classifier is configured to assign flow identifiers to the plurality of visual data flows.

14. The processor of claim 1, wherein providing the information on the processing includes issuing an interrupt request to the another processor.

15. A processor for processing data, comprising:
   a flow classifier configured to assign a flow identifier to a data flow, wherein the data flow comprises data captured by a same camera; and
   a first set of circuits configured to
      process a plurality of data blocks of the data flow,
      determine whether to provide result of the processing to another processor based on the flow identifier, wherein the flow identifier corresponds to an entry of a data structure, and wherein the data structure is to store flow configuration received from the another processor,
      provide the result to the another processor when the flow identifier indicates to provide the result to the another processor, and
      provide the result to a second set of circuits within the processor otherwise.

16. The processor of claim 15, wherein the second set of circuits receives data from the another processor, wherein the data is generated by the another processor in response to processing the result provided by the first set of circuits.

17. The processor of claim 15, wherein the assignment is based on flow mapping received from the another processor.

18. A system comprising:
   a processor and another processor in one chip,
   the processor including:
      a flow classifier configured to assign a flow identifier to a data flow, wherein the data flow comprises data captured by a same camera; and
      a first set of circuits configured to
         process a plurality of data blocks of the data flow, and
         determine whether to provide information on the processing of the plurality of data blocks to the another processor based on the flow identifier, wherein the flow identifier corresponds to an entry of a data structure, and wherein the data structure is to store flow configuration received from the another processor.

* * * * *